US011126512B2

(12) United States Patent
Chandrashekar et al.

(10) Patent No.: US 11,126,512 B2
(45) Date of Patent: Sep. 21, 2021

(54) FAILURE RESISTANT DISTRIBUTED COMPUTING SYSTEM

(71) Applicant: ServiceNow, Inc., Santa Clara, CA (US)

(72) Inventors: Sridhar Chandrashekar, Sammamish, WA (US); Swapnesh Patel, Bothell, WA (US); Viral Shah, Bothell, WA (US); Anurag Garg, Renton, WA (US); Anjali Chablani, Redmond, WA (US)

(73) Assignee: ServiceNow, Inc., Santa Clara, CA (US)

( * ) Notice: Subject to any disclaimer, the term of this patent is extended or adjusted under 35 U.S.C. 154(b) by 192 days.

(21) Appl. No.: 16/356,090

(22) Filed: Mar. 18, 2019

(65) Prior Publication Data

US 2019/0278673 A1    Sep. 12, 2019

Related U.S. Application Data

(63) Continuation of application No. 15/376,184, filed on Dec. 12, 2016, now Pat. No. 10,261,873, which is a
(Continued)

(51) Int. Cl.
*G06F 11/00* (2006.01)
*G06F 11/20* (2006.01)
(Continued)

(52) U.S. Cl.
CPC ...... *G06F 11/2025* (2013.01); *G06F 11/0709* (2013.01); *G06F 11/2007* (2013.01);
(Continued)

(58) Field of Classification Search
CPC ............ G06F 11/2007; G06F 11/0709; G06F 11/0712; G06F 11/202; G06F 11/2023;
(Continued)

(56) References Cited

U.S. PATENT DOCUMENTS 6,658,589 B1    12/2003  Taylor
6,957,251 B2    10/2005  Wisner et al.
(Continued)

FOREIGN PATENT DOCUMENTS

WO    95/16967 A1    6/1995

OTHER PUBLICATIONS

Office Action for Australian Patent Application No. 2017261529 dated Apr. 18, 2019, 3 pgs.
(Continued)

*Primary Examiner* — Joseph D Manoskey
(74) *Attorney, Agent, or Firm* — Fletcher Yoder PC

(57) ABSTRACT

A failure resistant distributed computing system includes primary and secondary datacenters each comprising a plurality of computerized servers. A control center selects orchestrations from a predefined list and transmits the orchestrations to the datacenters. Transmitted orchestrations include less than all machine-readable actions necessary to execute the orchestrations. The datacenters execute each received orchestration by referencing a full set of actions corresponding to the received orchestration as previously stored or programmed into the computerized server and executing the referenced full set of actions. At least one of the orchestrations comprises a failover operation from the primary datacenter to the secondary datacenter. Failover shifts performance of task from a set of processing nodes of the primary datacenter to a set of processing nodes of the secondary datacenter, such tasks including managing storage accessible by one or more remote clients and running programs on behalf of remote clients.

20 Claims, 11 Drawing Sheets

Related U.S. Application Data continuation of application No. 14/985,740, filed on Dec. 31, 2015, now Pat. No. 9,519,553.

(60) Provisional application No. 62/098,430, filed on Dec. 31, 2014.

(51) Int. Cl.
*H04L 29/08* (2006.01)
*G06F 11/07* (2006.01)
*H04L 12/24* (2006.01)
*H04L 29/12* (2006.01)

(52) U.S. Cl.
CPC ...... *G06F 11/2038* (2013.01); *H04L 41/0668* (2013.01); *H04L 61/1511* (2013.01); *H04L 67/1034* (2013.01); *H04L 67/1097* (2013.01); *G06F 11/2048* (2013.01); *G06F 2201/85* (2013.01)

(58) Field of Classification Search
CPC ............. G06F 11/2025; G06F 11/3006; G06F 11/2038; G06F 11/2048; G06F 2201/85; H04L 67/1034; H04L 67/1097; H04L 41/0668; H04L 61/1511
See application file for complete search history.

(56) References Cited

U.S. PATENT DOCUMENTS

| | | |
|---|---|---|
| 7,020,706 B2 | 3/2006 | Cates |
| 7,124,310 B2 | 10/2006 | Hayashi et al. |
| 7,716,353 B2 | 5/2010 | Golovinsky |
| 7,769,718 B2 | 8/2010 | Murley |
| 7,925,981 B2 | 4/2011 | Pourheidari |
| 8,122,284 B2 | 2/2012 | Taylor et al. |
| 8,402,127 B2 | 3/2013 | Solin |
| 8,402,306 B1 | 3/2013 | Kruck et al. |
| 8,612,408 B2 | 12/2013 | Trinon |
| 8,832,652 B2 | 9/2014 | Mueller |
| 9,065,783 B2 | 6/2015 | Ding |
| 9,098,322 B2 | 8/2015 | Apte |
| 9,122,552 B2 | 9/2015 | Whitney |
| 9,274,902 B1 | 3/2016 | Morley |
| 9,317,327 B2 | 4/2016 | Apte |
| 9,363,252 B2 | 6/2016 | Mueller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 2005/0193245 A1 | 9/2005 | Hayden et al. |
| 2005/0283658 A1 | 12/2005 | Clark et al. |
| 2006/0190766 A1 | 8/2006 | Adler et al. |
| 2009/0049054 A1 | 2/2009 | Wong |
| 2013/0151680 A1 | 6/2013 | Salinas |
| 2014/0059226 A1* | 2/2014 | Messerli ............... H04L 47/783 709/226 |
| 2014/0237095 A1 | 8/2014 | Bevilacqua-Linn |
| 2015/0301910 A1 | 10/2015 | Sathyanarayana |
| 2015/0370659 A1* | 12/2015 | Pershin ............... G06F 11/2079 714/4.11 |
| 2016/0062853 A1* | 3/2016 | Sugabrahmam ...... G06F 3/0647 714/4.11 |

OTHER PUBLICATIONS

Wikipedia, the Free Encyclopedia, "Publish-Subscrive Pattern", retrived from https://en.wikipedia.org/w/index.php?title=Publish-subscribe_pattern&oldid=695822498, last modified Dec. 18, 2015, downloaded Jan. 22, 2016, 4 pp.

\* cited by examiner

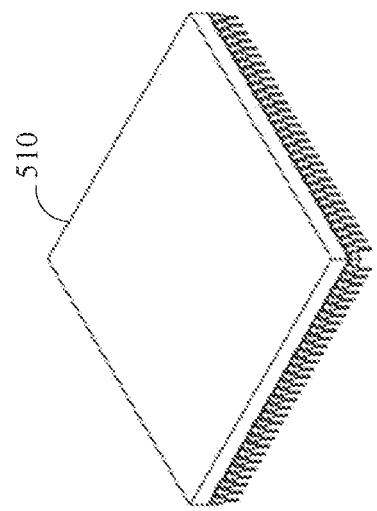
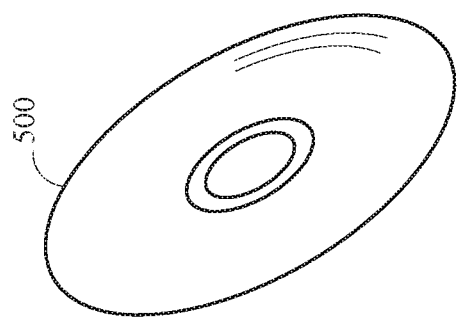

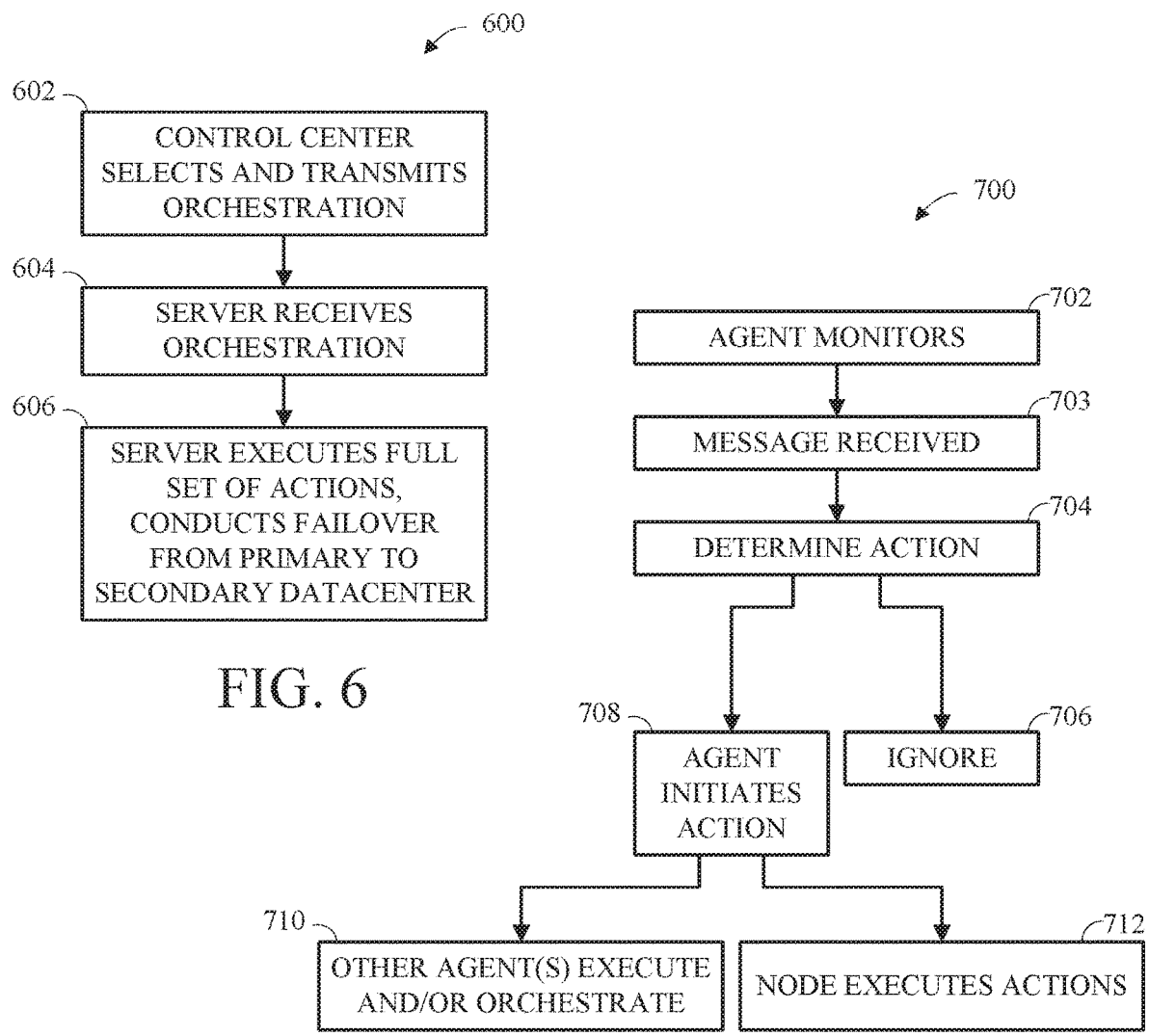

| Application Instances | IAD1 (primary) |
|---|---|
| cheshire netapp | Db: db75098, iad1:3306 chesire_1(P) |
| | 1202 — 1 √ Run Database Transfer Pre Validation Test<br>2 √ Wait for Replication To Finish<br>3 √ Switch Database Instance to ReadWrite<br>4 √ Switch Node Scheduler State<br>5 √ Run Database Transfer Post Validation Test<br>Roll Back<br>1 Rollback Switch Database Instance to ReadOnly<br>2 Rollback Update My.conf<br>3 Rollback Switch Node Scheduler State |
| | App: app70036.iad1 cheshire001 |
| | Connected to: db75098.iad1:3306\|any |
| | 1203 — 1 √ Stop Application Node<br>2 √ Update Database Connection in Application Node<br>3 √ Restart Application Node<br>Roll Back<br>1 Rollback Stop Application Node<br>2 Rollback Update Database Connection in Application Node<br>3 Rollback Restart Application Node |
| | App: app72050.iad1 cheshire002 |
| | Connected to: db75098.iad1:3306\|any |
| | 1204 — 1 √ Stop Application Node<br>2 √ Update Database Connection in Application Node<br>3 √ Restart Application Node<br>Roll Back<br>1 Rollback Stop Application Node<br>2 Rollback Update Database Connection in Application Node<br>3 Rollback Restart Application Node |
| | Overall |
| | 1205 — 1 √ Switch DNS Entry<br>2 √ Check For DNS Propagation<br>3 √ Check Node Availability Status<br>4 √ Update Authorative Fields<br>5 √ Run Discovery<br>Roll Back<br>1 Rollback Switch DNS Entry |

FIG. 12A

| SJC2 (standby) | Legend |
|---|---|
| Db: db18110, sjc2:3306 chesire_1(S) | √ : Completed |

1206 —
- 1 √ Run Database Transfer Pre Validation Test
- 2 √ Switch Database Instance To ReadOnly
- 3 √ Run Database Transfer Post Validation Test
- Roll Back
- 1 Rollback Switch Database Instance to ReadWrite
- 2 Rollback Update My.conf
- 3 Rollback Switch Node Scheduler State Legend:
- √ : Completed
- X : Error/Failed
- N : Not Start
- B : In Progress
- C : Completed
- E : Error/Failed App: app16250.sjc2 cheshire003

Connected to: db75098.iad1:3306|specified

1207 —
- 1 √ Stop Application Node
- 2 √ Update Database Connection in Application Node
- 3 √ Restart Application Node
- Roll Back
- 1 Rollback Stop Application Node
- 2 Rollback Update Database Connection in Application Node
- 3 Rollback Restart Application Node App: app16237.sjc2 cheshire004

Connected to: db75098.iad1:3306|specified

1208 —
- 1 √ Stop Application Node
- 2 √ Update Database Connection in Application Node
- 3 √ Restart Application Node
- Roll Back
- 1 Rollback Stop Application Node
- 2 Rollback Update Database Connection in Application Node
- 3 Rollback Restart Application Node

FIG. 12B

The Transfer operation completed successfully. All application nodes are up and running.

Last Transfer FROM db18110.sjc2 : 3306 TO db75098.iad1 : 3306 took 563 seconds
Click here to View Operation Detail

FIG. 12C

FAILURE RESISTANT DISTRIBUTED COMPUTING SYSTEM

CROSS REFERENCE TO RELATED APPLICATIONS

The present application is a continuation of U.S. application Ser. No. 15/376,184, filed Dec. 12, 2016, which is a continuation of U.S. application Ser. No. 14/985,740, filed Dec. 31, 2015, which claims the benefit of U.S. Provisional Application No. 62/098,430, filed Dec. 31, 2014, entitled, "Failure Resistant Distributed Computing System", herein incorporated by reference.

TECHNICAL FIELD

The present disclosure is generally related to information technology, and in particular to a failure resistant distributed computing system.

BACKGROUND

Modern computing systems often include large systems including multiple servers or processors communicating over local-area or wide-area networks serving multiple clients. These systems can store very large amounts of data and process many transactions in a given time period. Maintaining optimal system performance and the collection and analysis of transactional and dimensional data can be difficult or suboptimal in current systems.

SUMMARY

Disclosed herein are implementations of systems, methods, and apparatuses for providing a failure resistant distributed computing system.

According to an implementation, a failure resistant network-based distributed computing system with a plurality of datacenters comprising primary and secondary datacenters, each datacenter comprising a plurality of computerized servers, each of the computerized servers comprising a processor, a communications port connected to a network, a memory comprising instructions executable by the processor, and a messaging queue connected via the communications port with the computerized servers of the datacenter, wherein the processor is configured to execute a processing node, and the messaging queues of the primary and secondary datacenters are communicatively interconnected via their respective communication ports by one or more links, the system further comprising a control center comprising one or more digital data processing machines, a communications port, a memory, and a transmitter that communicates via signals sent over its communications port coupled to the at least one messaging queue of each datacenter, wherein the control center is programmed to perform machine-executable operations stored in its memory to select orchestrations from a predefined list stored in its memory, and transmit, using the transmitter, an identification of the selected orchestrations to a server of the computerized servers of the primary or secondary datacenters via a respective one of the messaging queues, and wherein each of the computerized servers of the primary and secondary datacenters is programmed to perform machine-executable operations to, responsive to receiving identification of one of the selected orchestrations from the control center via one of the messaging queues, execute the identified orchestration using its processor by referencing a full set of actions corresponding to the received orchestration as previously stored or programmed into the computerized server and executing the referenced full set of actions on the server processor, and at least one of the machine-executable actions is to direct at least one other computerized server to execute prescribed tasks on its processor, and the predefined list of orchestrations comprises at least one machine-executable orchestration to conduct a failover operation from the primary datacenter to the secondary datacenter, the failover operation comprising shifting performance of tasks from a set of processing nodes of the primary datacenter to a set of processing nodes of the secondary datacenter, the tasks comprising managing storage accessible by one or more clients located remotely from the datacenters, and running programs of machine-implemented operations on behalf of clients remotely located from the datacenters.

According to an implementation, a computer-implemented method is provided for operating a failure resistant distributed computing system comprising primary and secondary datacenters, each datacenter comprising a plurality of computerized servers, each of the computerized servers comprising a processor configured to execute a processing node, and each datacenter comprising at least one messaging queue in communication with the computerized servers of the datacenter, wherein the messaging queues of the primary and secondary datacenters are communicatively interconnected by one or more links at respective communication ports associated with each datacenter, the system further comprising a control center, the method comprising machine-executed operations of selecting with the control center orchestrations from a predefined list stored in the control center, transmitting via the control center an identification of the selected orchestrations to the computerized server of the primary or secondary datacenters via one or more of the messaging queues, and performing operations by each of the computerized servers of the primary and secondary datacenters comprising receiving, via the communications port of the datacenter, identification of one of the selected orchestrations from the control center via one of the messaging queues, responding to the receiving identification by executing the identified orchestration by referencing a full set of actions corresponding to the received orchestration as previously stored or programmed into the computerized server and executing the referenced full set of actions, wherein at least one of the machine-executable actions comprises directing at least one other computerized server to execute prescribed tasks, and the predefined list of orchestrations comprises at least one machine-executable orchestration to conduct a failover operation from the primary datacenter to the secondary datacenter, the failover operation comprises shifting performance of the tasks from a set of processing nodes of the primary datacenter to a set of processing nodes of the secondary datacenter, the tasks comprising managing storage accessible by one or more clients located remotely from the datacenters, and running programs of machine-implemented operations on behalf of clients remotely located from the datacenters.

According to an implementation, a failure resistant network-based distributed computing system with a plurality of datacenters is provided, comprising primary and secondary datacenters, each datacenter comprising a plurality of computerized servers, wherein each of the computerized servers of the primary and secondary datacenters is programmed to perform machine-executable operations to, responsive to receiving identification of a selected orchestrations from a control center via a messaging queue, execute the identified orchestration using its processor by referencing a full set of actions corresponding to the received orchestration as previously stored or programmed into the computerized server and executing the referenced full set of actions on the server processor, and at least one of the machine-executable actions is to direct at least one other computerized server to execute prescribed tasks on its processor, and a predefined list of orchestrations comprises at least one machine-executable orchestration to conduct a failover operation from the primary datacenter to the secondary datacenter, the failover operation comprising shifting performance of tasks from a set of processing nodes of the primary datacenter to a set of processing nodes of the secondary datacenter, the tasks comprising managing storage accessible by one or more clients located remotely from the datacenters, and running programs of machine-implemented operations on behalf of clients remotely located from the datacenters.

According to an implementation, a non-transitory computer-readable storage medium, is provided comprising executable instructions that, when executed by a processor, facilitate performance of operations of the method described above.

BRIEF DESCRIPTION OF THE DRAWINGS

The description herein makes reference to the accompanying drawings wherein like reference numerals refer to like parts throughout the several views, and wherein:

FIG. 5A is a perspective view of an example digital data storage.

FIG. 5B is a perspective view of an example logic circuit.

FIG. 6 is a flow chart of example operations performed by a control center and datacenter of a distributed computing system.

FIG. 7 is a flow chart of certain example operations performed by computerized servers of a distributed computing system.

FIGS. 12A-C are parts that together comprise a pictorial view of an example status report resulting from an example data management transfer operation.

DETAILED DESCRIPTION

Figure 1:
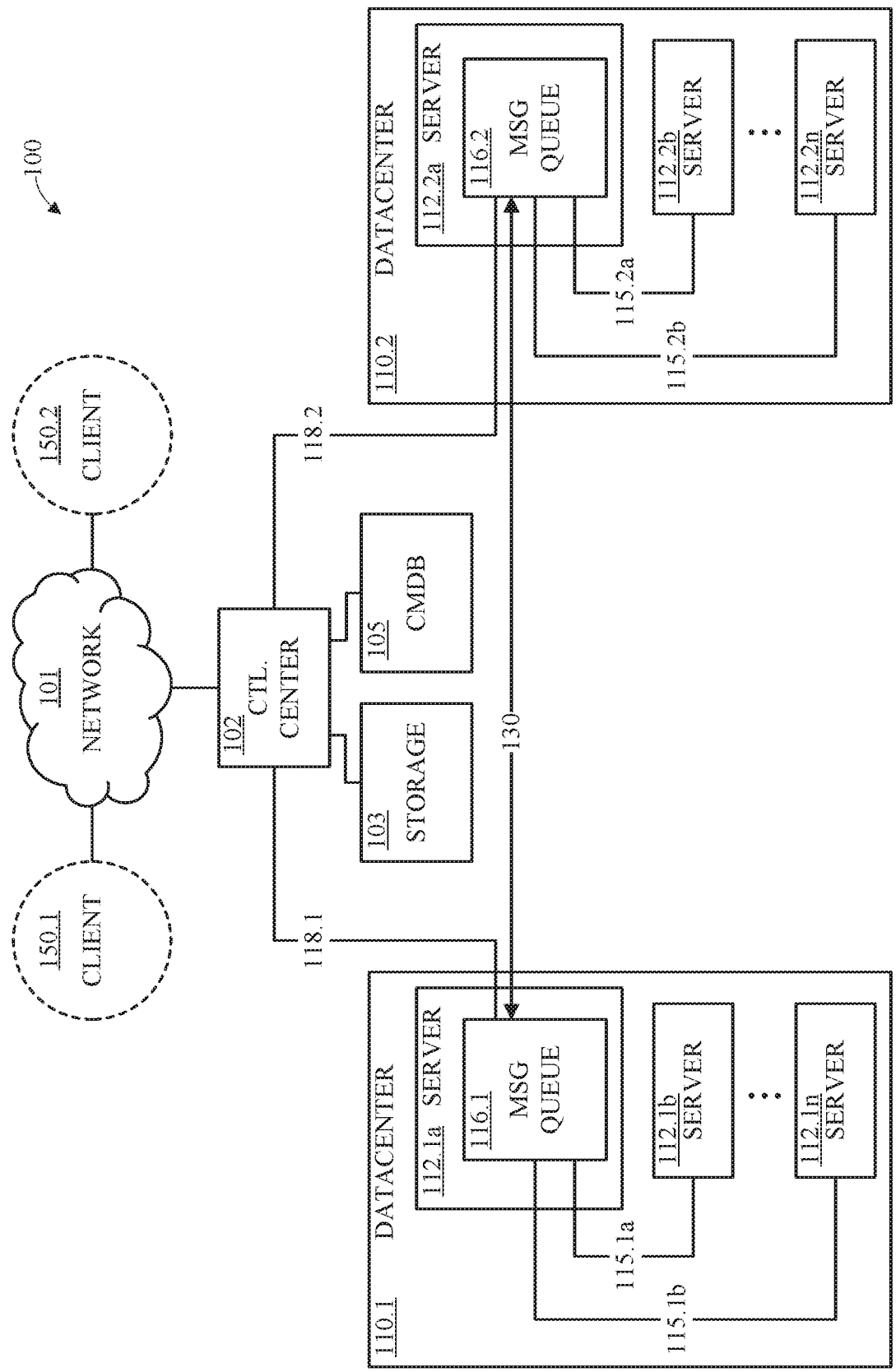
FIG. 1 is a block diagram of an example distributed computing system.

The nature, objectives, and advantages of the present disclosure will become more apparent to those skilled in the art after considering the following detailed description in connection with the accompanying drawings.

1. Hardware Components and Interconnections

One implementation of the present disclosure concerns a failure resistant distributed computing system. The hardware components and interconnections of this digital data processing system and the related network are described as follows, whereas the functionality of these systems are separately discussed further below.

A. Cloud Computing Environment

Cloud computing can provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or a single-tenant architecture. Under a multi-tenant architecture, installations or instantiations of application, database, and/or other software application servers may be shared amongst multiple customers. For example, a single web server (e.g., a unitary Apache installation), application server (e.g., unitary Java Virtual Machine) and/or a single database server catalog (e.g., a unitary MySQL catalog) may handle requests from multiple customers. In a multi-tenant architecture, data or applications used by various customers can be commingled or shared. According to an implementation of this architecture, the application and/or database server software can distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an example implementation, a customer instance is composed of four web server instances, four application server instances, and two database server instances. As previously described, each of these server instances may be located on different physical servers and each of these server instances may share resources of the different physical servers with a number of other server instances associated with other customer instances. The web, application, and database servers of the customer instance can be allocated to two different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server can replicate data to the secondary database server. The cloud computing infrastructure can be configured to direct traffic to the primary pair of web servers which can be configured to utilize the primary pair of application servers and primary database server respectively. In a failure scenario, the secondary servers may be converted to primary servers.

The application servers can include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances can be configured with a database configuration and schema to facilitate the operation of the platform. For example, the database server instance can be configured with various tables for storing metadata about applications, tables/fields, menus, forms, business rules, scripts, and custom UI elements that are used to customize the appearance and operation of the customer instance. In some implementations, the application servers can include web server functionality and the web servers can be omitted.

In an alternative implementation, a customer instance may include only two application servers and one database server. In a given cloud infrastructure system, different implementations of customer instances may be used for different customer instances at the same time. Other configurations and implementations of customer instances may also be used.

The proper allocation of computing resources of a physical server to an instance of a particular software server, such as a database server instance, can be important to the efficient and effective functioning of the cloud infrastructure. If too few resources are allocated, performance of the services provided to the customer using the database server may be degraded. If too many resources are allocated, computing resources may be wasted as the extra allocated resources may not meaningfully increase the performance of the services provided to the customer. Repeated over allocation of computing resources may require that additional server hardware be purchased to satisfy the over allocation, resulting in a greater than necessary cost for providing the cloud infrastructure. In current systems, the amount of possible RAM may be constrained per physical server and the utilization of RAM may be relatively higher than other available computing resources, such as processing cycles (e.g., CPU) and storage (e.g., solid state and magnetic hard disks). Thus, it may be advantageous to more precisely allocate the amount of RAM to each database server instance due to the relative scarcity of RAM resources.

The techniques and devices described herein relate to the allocation of cloud computing resources, and particularly, the allocation of memory (RAM) resources to database servers installed on a particular physical server machine. An initial allocation of RAM to a database server can be generated and the database server can be provisioned using the initial allocation. Periodic measurements can be taken of the database server tables and buffer sizes and ratios are calculated. Based on the ratios, a desired memory allocation can be determined, for example using a pre-determined lookup table of memory allocation sizes to the calculated ratios. The desired memory allocation can be compiled in a report. The report can include functionality to permit a user to initiate an automated action to re-provision the database server using the desired memory allocation. Alternatively, the re-provisioning of the database server can be initiated automatically without user interaction.

B. Overall Architecture

FIG. 1 is a block diagram of an example distributed computing system 100. The system 100 includes a primary datacenter 110.1 and a secondary datacenter 110.2 (110) (parenthetical or reference character with no decimal point is a reference character meaning collectively or an arbitrary instance/example). The datacenters 110 are each coupled to a control center 102. The control center 102 is linked to one or more clients 150.1, 150.2 (150) via a communications network 101. Broadly, the control center 102 directs operations of the datacenters 110 on behalf of the clients 150. Some examples of these operations include hosting storage for the clients 150 and running applications for the clients 150. In one implementation, the system 100 may constitute an example of cloud computing, performed on behalf of the client 150. In one example, the system 100 comprises a high availability system, where each data center 110 comprises a massively parallel execution engine.

The control center 102 comprises at least one digital data processing machine. This is exemplified by a server, workstation, desktop computer, notebook computer, mainframe computer, datacenter, or other hardware appropriate to carry out the functionality described herein. The control center 102 is coupled to or includes storage 103 containing a predefined list of machine-readable software orchestrations. Each orchestration names, represents, signifies, embodies, lists, or incorporates a set of machine-executable actions or instructions that carry out the orchestrations. According to an implementation where the orchestrations do not contain the corresponding machine-executable actions, then the storage 103 may additionally contain the actions associated with each orchestration. The functionality of the orchestration is discussed in greater detail below. In contrast to the illustrated example, the orchestrations may instead be provided in storage (not shown) outside of the control center 102 but nevertheless accessible by the control center 102. The storage 103 encompasses machine-readable storage devices and media of all types, as well as storage by virtue of being programmed into circuitry such as an ASIC, FPGA, DSP, and such. Numerous examples of storage and logic circuits are explained in detail below.

The control center 102 is also coupled to or includes a configuration management database (CMDB) 105. The CMDB 105 comprises a database containing configuration item (CI) entries for the system's 100 information technology (IT) assets such as systems, software, facilities, products, network, storage, and the like. CI types may also include business types, such as organizations, people, markets, products, vendors, and partners. These assets, as represented in the CMDB 105, may be referred to as the CIs. The CMDB 105 also describes the dependencies or other relationships among the CIs. CMDBs are widely used, and many structural and operational details of the CMDB 105 will be apparent to those of ordinary skill in the relevant art, having the benefit of this disclosure.

The control center 102 is linked to the clients 150 via the telecommunications network 101. Although illustrated as a central hub for ease of illustration, the network 101 may be implemented by any form of communication link that supports data exchange between the control center 102 and the clients 150 in satisfaction of the functions and purposes expressed herein. In this regard, the network 101 may be configured as an overlay network, or a bus, mesh, tree, ring, star, peer-to-peer, overlay, or any combination or permutation of these or other known networks. The network 101 or one or more subcomponents thereof may include the public Internet or a corporate or government Intranet, for example. The network 101 may include one or more local area networks, wide area networks, Intranets, Extranets, Inter-networks, Wi-Fi networks, or any other suitable technology using wires, radiofrequency, microwave, satellite, cellular, optical, or other telecommunications.

Each of the datacenters 110 includes a plurality of computerized servers 112. In one example, each datacenter 110 may be provided by one or more physical racks of computing machines. More particularly, the datacenter 110.1 includes computerized servers 112.1a and 112.1b through 112.1n, and the datacenter 110.2 includes computerized servers 112.2a and 112.2b through 112.2n, although these numbers may be increased or decreased in practice to suit the needs and context of the implementation. Each of the computerized servers comprises one or more digital processing machines. These may be exemplified by a server, workstation computer, or other hardware appropriate to carry out the functionality described herein.

Each datacenter 110 includes a messaging queue 116 in communication with the computerized servers of that datacenter. In the illustrated example, each datacenter's messaging queue is run, driven, supported, hosted, or otherwise provided by one of the datacenter's computerized servers. For instance, in the illustrated example the computerized server 112.1a of the datacenter 110.1 provides a messaging queue 116.1, and the computerized server 112.2a of the datacenter 110.2 provides a messaging queue 116.2. Despite the illustrated arrangement, and according to the needs of the particular implementation, the messaging queues 116 may be provided by another machine or circuit (not shown) other than the computerized servers. In the illustrated example, each of the messaging queues 116 may be implemented by a general or special purpose storage device, nonvolatile storage, volatile storage, circuit memory, RAM, or any other device, data structure, or construct adequate to satisfy the functionality explained herein.

Each datacenter's messaging queue 116 is connected to the control center 102 via a link 118. Further links 115 couple each messaging queue 116 to all servers of the relevant datacenter 110, enabling the messaging queue 116 to provide a vehicle for distributing communications from the control center 102 to the various computerized servers. An interlink 130 couples the messaging queues 116.1, 116.2, which, for example aids in conducting failover operations where one datacenter assumes some level of control over the other datacenter. The foregoing links 115 and interlink 130 may comprise one or more wires, cables, fiber optics, wireless connections, busses, backplanes, mother boards or other constructs to enable communications meeting the function and purposes expressed herein. Some, none, or all of these links may constitute a network, which may be separate from the network 101 or share some or all features with the network 101.

Figures 8, 9:
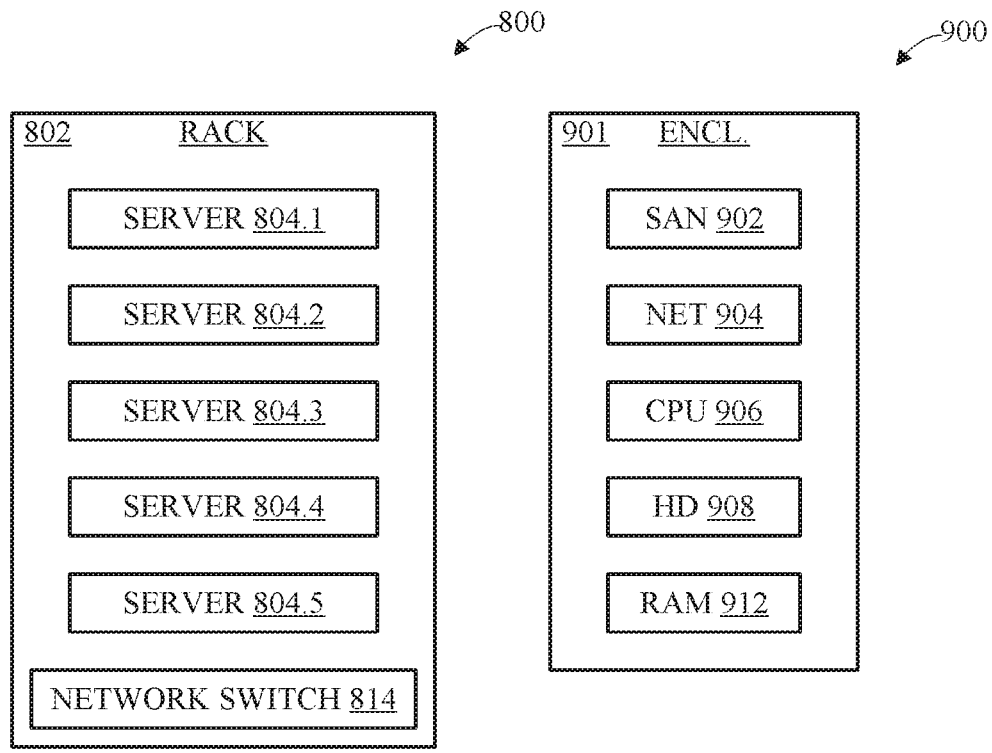
FIG. 8 is a block diagram showing the hardware components of an example datacenter.
FIG. 9 is a block diagram showing the hardware components of an example server.

To provide some further illustration of the hardware of an example datacenter, FIG. 8 provides a block diagram showing the hardware components of an example datacenter. The example datacenter 800 includes a storage rack 802 containing various servers 804.1-5 and one or more network switches such as 814.

To provide some further illustration of the hardware of an example computerized server, FIG. 9 provides a block diagram showing the hardware components of an example computerized server. The example computerized server 900 includes a storage enclosure 901 containing a storage area network (SAN) unit 902, networking hardware 904, CPU 906, and RAM 912. The computerized server 900 also includes one or more digital data storage devices which in this case are exemplified by hard disk drives 908.

Figure 10:
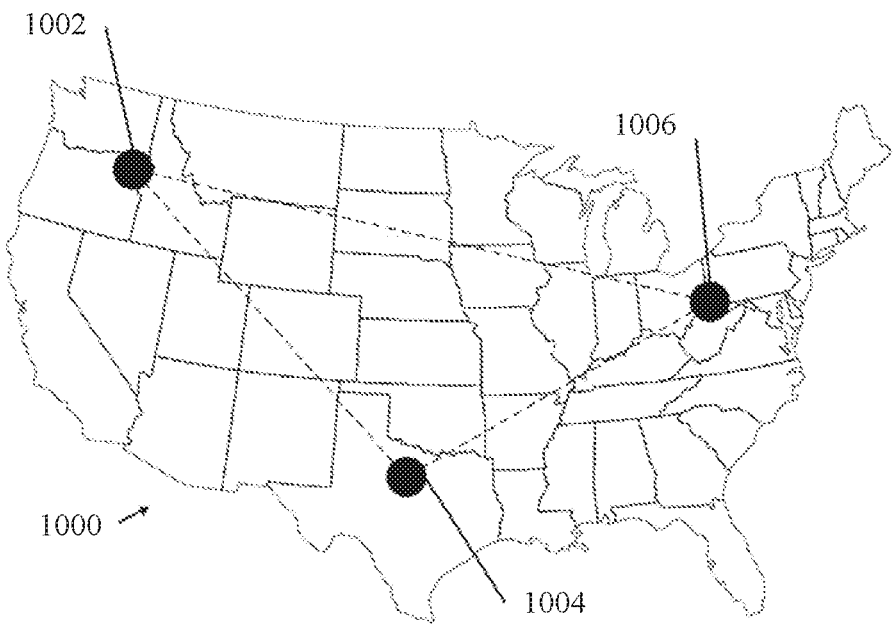
FIG. 10 is a map showing physical locations of datacenter hardware.

In one example, the datacenters 110 may be physically located in geographically diverse locations. In this regard, FIG. 10 is a diagram showing physical locations of datacenter hardware. As illustrated, datacenters 1002, 1004, and 1006 are located in geographically distinct sites across the United States 1000.

C. Computerized Servers

As mentioned above, each control center includes multiple computerized servers that conduct functions such as running applications and managing data storage on behalf of remote clients. To illustrate these in greater detail, FIG. 2 provides a block diagram of an example computerized server of the distributed computing system of FIG. 1.

Figure 2:
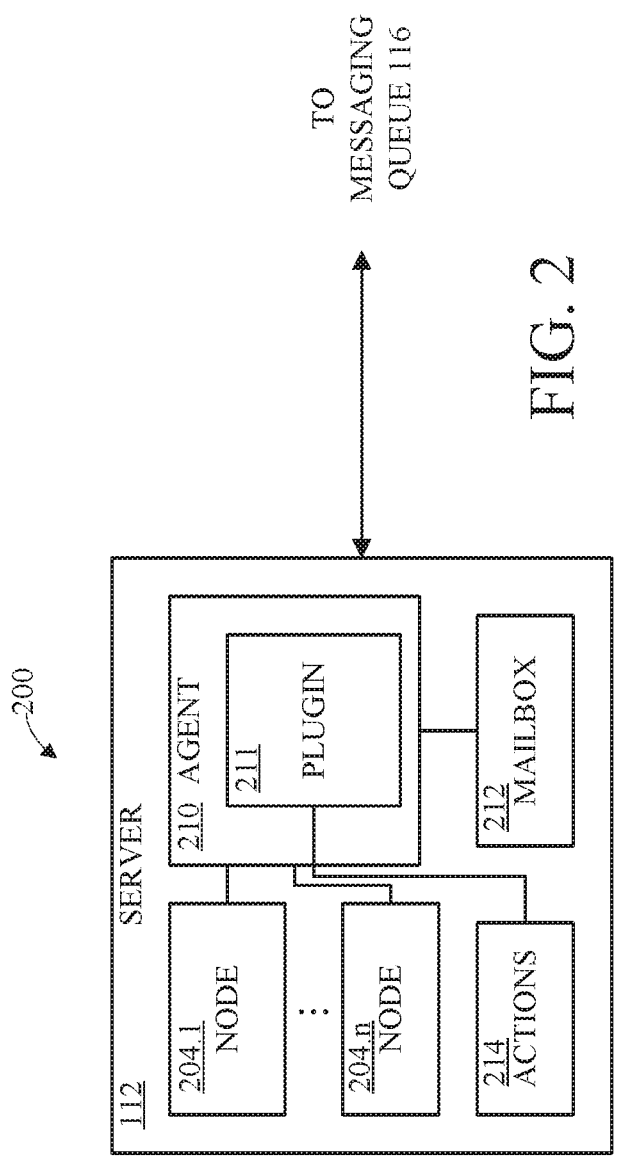
FIG. 2 is a block diagram of an example computerized server of the distributed computing system of FIG. 1.

Whereas FIG. 1 illustrates the largely physical architecture of the system 100, including hardware of the datacenters 110, FIG. 2 depicts some processing features provided by the computerized server 112 hardware. Computerized server 112 is one example of an implementation of the servers 112 illustrated in FIG. 1. One of these features is the various processing nodes 204.1-n. Each processing node 204 runs an application program, module, or algorithm, or conducts a database function on behalf of one of the remote clients 150 and according to directions of the control center 102. The functionality of the nodes is discussed in greater detail below. In one implementation, each node 204 comprises a virtual machine instantiation performing certain machine-executable actions.

Alternatively, a node 204 may be an application. For example, a node 204 need not have its own operating system. An agent 210 is a processing feature of the computerized server 112, which can modify or control operations of the computerized server 112, including managing operations and configuration of the processing nodes. In addition to managing the nodes 204, the agent 210 may also control operations of the computerized server 112 outside the nodes 204. For example, the agent can configure an operating system common to multiple processing nodes or server 112.

The agent 210 includes a mailbox 212. The mailbox 212 may be implemented in the agent or via operating system build-in functionality, for example. The term "mailbox" is used without any intended limitation or constraint as to mail or e-mail or other message formats. Broadly, the mailbox 212 provides a site for receiving commands, data, messages, or other signals from the associated messaging queue 116. The mailbox 212 may, for example, be implemented as a device, buffer, storage unit, nonvolatile storage, volatile storage, circuit memory, RAM, or any other hardware, software, or combination thereof.

The agent 210 may or may not include a plugin module 211, depending on the particular implementation. Plugin module 211 may be configured to accept an executable module from the control center 102 to permit the agent 210 to execute tasks other than distributed orchestrations. For example, according to an implementation, plugin 211 could receive plugins for performing discovery of information on server 112 or other servers in datacenter 110, or could receive an auto-remediation plugin that can be configured to automatically perform tasks or orchestrations based on information collected by agent 210 without receiving direction from the control center 102. The executable modules plugged into plugin module 211 can be configured to send and receive messages from the control center 102 and other servers and/or datacenters using mailbox 212, such as described elsewhere with respect to orchestrations.

The computerized server 112 also includes storage containing a plurality of machine-executable actions 214. The machine-executable actions from 214 may be stored or programmed into the computerized server 112, and namely, contained in storage accessible by the computerized server 112, incorporated into circuitry of the computerized server 112, incorporated into code executable by the server 112, or other mechanisms.

For each of the orchestrations in the control center's storage 103, the computerized server storage 214 contains machine-readable data or instructions representing a full set of machine-executable actions needed to perform the orchestration. In contrast to storage on board the server 112, the orchestrations may instead be provided in storage (not shown) outside of, but nevertheless accessible by, the computerized server 112. The storage 214 encompasses machine-readable storage devices and media of all types. In contrast to the storage of data, the storage 214 further includes "storage" by virtue of being programmed into a circuitry such as an ASIC, FPGA, DSP, and such. Various examples of storage and logic circuits are explained in greater detail below.

D. High Availability Processing Architecture

Figure 3:
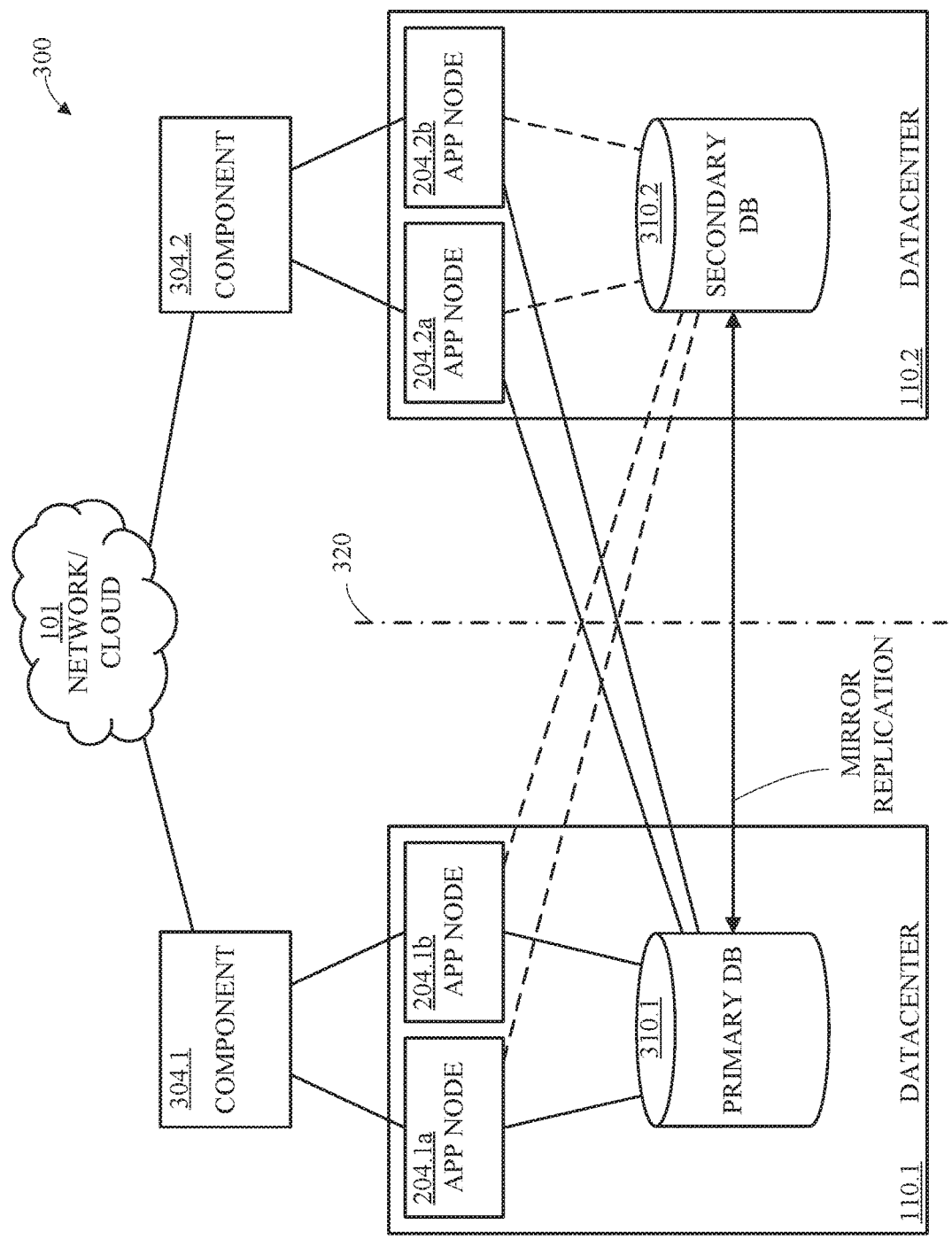
FIG. 3 is a block diagram of an example high availability processing architecture.

FIG. 3 depicts a block diagram of an example high availability processing architecture. The illustrated distributed computing system 300 provides an alternate depiction of the components of FIGS. 1-2, with greater emphasis on failure resistant features of the system. Broadly, the system 300 includes proxy-load balancers 304.1, 304.2 and datacenters 110.1, 110.2. The proxy/load balancers 304 are coupled to a communications network graphically depicted by the cloud 101. The cloud 101 may be satisfied by the components of the network 101 as discussed above.

The datacenter 110.1 includes a primary database 310.1, and the datacenter 110.2 includes a secondary database 310.2. The datacenters 110 operate in such a manner that the secondary database 310.2 can provide an exact or substantially exact mirror of the primary database 310.1. A line 320 is used to graphically emphasize the logical boundary between datacenters 110. Depending upon the intended application, as will be apparent to those of ordinary skill in the relevant art, the databases 310 may range from mere digital data storage to a database management system (DBMS).

Each datacenter 110 includes two application nodes 204.1a, 204.1b, 204.2a, and 204.2b (204), although a greater or lesser number may be implemented in practice. The application nodes 204 are processing threads, modules, virtual machine instantiations, or other computing features of the datacenters 110 that run programs on behalf of remotely sited clients 150, and exchange related data with such clients 150 via the cloud 101. In connection with running these programs, occasions arise for the application nodes 204 to store and retrieve data, with the databases 310 filling this role. According to an implementation, each of the application nodes 204 connect to a single primary database 310.1, regardless of whether the database 310.1 is located in the same datacenter 110.1 as the application nodes 204.1 or not. For example, a primary database 310.1 may be read/write and a secondary database 310.2 may be configured to be read-only such that it mirrors changes from the primary database. Requests to the system 300 may be routed to the application nodes 204.1 in the datacenter 110.1 of the primary database 310.1 first, followed by the other datacenter 110.2. In a failover situation, the secondary database 310.2 may become read/write with the formerly primary database 310.1 switched to mirror the secondary database (which becomes the primary database). In this situation, each application node 204 can be reconfigured to point to the secondary database 310.2 (now the primary database) as shown by the dashed lines.

As mentioned above, each datacenter 110 may have its own component 304.1, 304.2 (304) that has a proxy-load balancer. Each load balancer 304 may be configured to direct traffic to respective servers 112 and processing nodes 204 located within its data center 110. In regard to proxy services, in one example the components 304 are configured to provide a single Internet-delivered service to remote clients 150 via the cloud 101, where this service is actually provided by a server farm comprising of the computerized servers 112 of the datacenters 110. The components 304 also coordinate requests from remote clients 150 to the datacenters 110, simplifying client access by masking the internal configuration of the datacenters 110. The components 304 may serve these functions by directing clients 150 to processing nodes as configured directly or via DNS.

In regard to load balancing, the components 304 can be configured to direct traffic to the secondary datacenter 110.2 in the event the primary datacenter 110.1 experiences one of many enumerated conditions predefined as failure. The load balancing functionality of the components 304 can be provided as separate components or as a single component.

E. Data Processing Implementations

The systems illustrated above include various components that may be implemented with data processing functionality, with some examples including the components 102, 105, 110, 112, 116, 204, 210, 212, 214, 304, and 310. Other components of the disclosed systems may also include smart features, and in this respect, these components may also include data processing features. In any of these cases, such data processing features may be implemented by one or more instances of hardware, software, firmware, or a subcomponent or combination of the foregoing. The hardware of these subcomponents is described in greater detail below.

As mentioned above, the various data processing entities of FIGS. 1-3 may be implemented in different ways.

Figure 4:
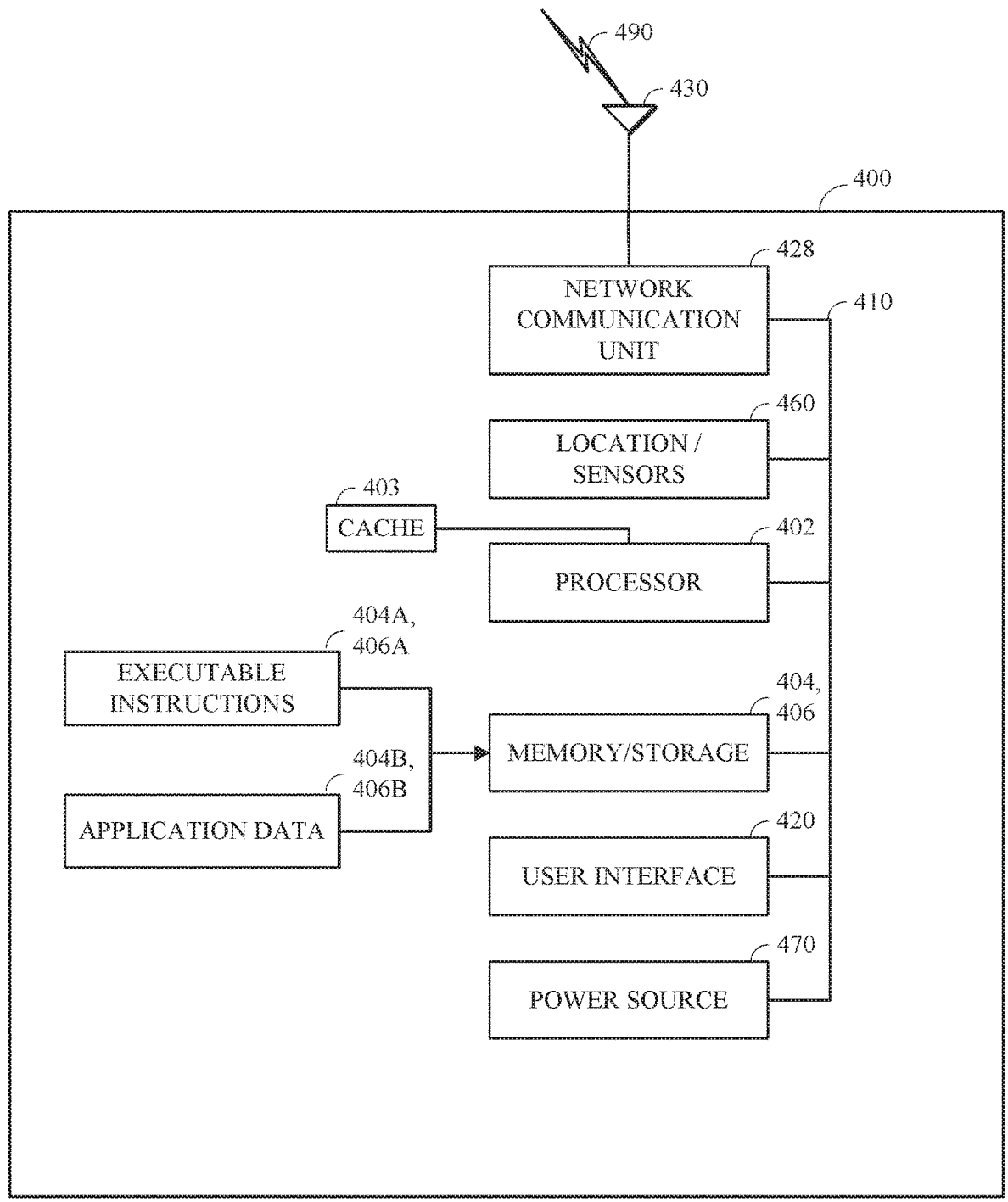
FIG. 4 is a block diagram of an example internal configuration of a digital data processing machine.

FIG. 4 is a block diagram of an example internal configuration of a computing device 400, such as a client 150 or server 112 device discussed previously, including an infrastructure control server, of a computing system. As previously described, clients 150 or servers 112 may take the form of a computing system including multiple computing units, or in the form of a single computing unit, for example, a mobile phone, a tablet computer, a laptop computer, a notebook computer, a desktop computer, a server computer and the like.

The computing device 400 can include a number of components, as illustrated in FIG. 4. CPU (or processor) 402 can be a central processing unit, such as a microprocessor, and can include single or multiple processors, each having single or multiple processing cores. Alternatively, CPU 402 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 402 can be distributed across multiple machines that can be coupled directly or across a local area or other network The CPU 402 can be a general purpose processor or a special purpose processor.

Random Access Memory (RAM 404) can be any suitable non-permanent storage device that is used as memory. RAM 404 can include executable instructions and data for immediate access by CPU 402. RAM 404 typically comprises one or more DRAM modules such as DDR SDRAM. Alternatively, RAM 404 can include another type of device, or multiple devices, capable of storing data for processing by CPU 402 now-existing or hereafter developed. CPU 402 can access and manipulate data in RAM 404 via bus 410. The CPU 402 may utilize a cache 430 as a form of localized fast memory for operating on data and instructions.

Storage 404 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 404 can include executable instructions 404A and application files/data 404B along with other data. The executable instructions 404A can include, for example, an operating system and one or more application programs for loading in whole or part into RAM 404 (with RAM-based executable instructions 404A and application files/data 404B) and to be executed by CPU 402. The executable instructions 404A may be organized into programmable modules or algorithms, functional programs, codes, and code segments designed to perform various functions described herein.

The term module, as used herein, can be implemented using hardware, software, or a combination thereof. A module may form a part of a larger entity, and may itself be broken into sub-entities. When a module is implemented using software, this software can be implemented as algorithmic components comprising program instructions stored in a memory, the instructions designed to be executed on a processor. The term "module" does not require any specific form of coding structure, and functional implementations of different modules may be independent but also may overlap and be performed by common program instructions. For example, a first module and a second module may be implemented using a common set of program instructions without distinct boundaries between the respective and/or common instructions that implement the first and second modules.

The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 404B can, for example, include user files, database catalogs and configuration information. In an implementation, storage 404 includes instructions to perform the discovery techniques described herein. Storage 404 may comprise one or multiple devices and may utilize one or more types of storage, such as solid state or magnetic.

The computing device 400 can also include one or more input/output devices, such as a network communication unit 406 and interface 430 that may have a wired communication component or a wireless communications component 490, which can be coupled to CPU 402 via bus 410. The network communication unit 406 can utilized any of a variety of standardized network protocols, such as Ethernet, TCP/IP, to name a few of many protocols, to effect communications between devices. The interface 430 can comprise one or more transceiver(s) that utilize the Ethernet, power line communication (PLC), WiFi, infrared, GPRS/GSM, CDMA, etc.

A user interface 420 can include a display, positional input device (such as a mouse, touchpad, touchscreen, or the like), keyboard, or other forms of user input and output devices. The user interface 420 can be coupled to the processor 402 via the bus 410. A graphical user interface (GUI) 420 is specifically a user interface that allows people to interact with a device in a graphical. It can be broken down into an input portion, an output portion, and a processor that manages, process, and interacts with the input and output portions. The input portion can accept input created by elements such as a mouse, touchpad, touchscreen, or the like. The output portion of a GUI can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and may accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of clients and servers 400 are also possible. For example, servers may omit display 420. RAM 404 or storage 404 can be distributed across multiple machines such as network-based memory or memory in multiple machines performing the operations of clients or servers. Although depicted here as a single bus, bus 410 can be composed of multiple buses, that may be connected to each other through various bridges, controllers, and/or adapters. Computing devices 400 may contain any number of sensors and detectors that monitor the device 400 itself or the environment around the device 400, or it may contain a location identification unit 460, such as a GPS or other type of location device. The computing device 400 may also contain a power source 470, such as a battery, so that the unit can operate in a self-contained manner. These may communicate with the CPU/processor 402 via the bus 410.

F. Storage and Logic Implementations

As mentioned above, various instances of digital data storage may be used, for example, to provide storage used by the systems of FIG. 1, FIG. 2, FIG. 3, and/or FIG. 4, to embody the storage 406 or RAM 404, etc. Depending upon its application, this digital data storage may be used for various functions, such as storing data and/or storing machine-readable instructions. These instructions may themselves aid in carrying out various processing functions, or they may serve to install a software program upon a computer, where such software program is thereafter executable to perform other functions related to this disclosure.

In any case, the storage media may be implemented to digitally store machine-readable signals. One example is optical storage such as CD-ROM, WORM, DVD, digital optical tape, disk storage 500 depicted in FIG. 5A, or other optical storage. Another example is direct access storage, such as a "hard drive", redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

An example storage medium is coupled to a processor so the processor may read information from, and write information to, the storage medium. In the alternative, the storage medium may be integral to the processor. In another example, the processor and the storage medium may reside in an ASIC or other integrated circuit.

In contrast to storage media that contain machine-executable instructions, as described above, a different example uses logic circuitry to implement some or all of the processing features described herein. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like. FIG. 5B shows an example logic circuit 510.

2. Operations

Having described the hardware components and interconnections of the disclosed digital data processing system and the related network, the operation of these components is now discussed. The operations of any method, process, or algorithm described in connection with the implementations disclosed herein may be embodied directly in hardware, firmware, software executed by hardware, circuitry, or a combination of these.

As discussed above, the system 100 comprises a control center 102, agents such as 210 running locally on each computerized server 112, and a communication channel to connect them. Without any intended limitation, the datacenters 110 may also be referred to as a server farm. This platform allows communication among agents 210 running on various servers 112 inside the server farm via a queuing mechanism. Any agent 210 can invoke one or more operations on any other agent 210, either in a synchronous or asynchronous fashion by sending one or more messages into the targeted agent's queue 116. Every agent has its own queue, and the agent listens to this queue for incoming messages. According to an implementation, when the targeted agent 210 receives a message, it invokes the necessary operation locally using a technique known as reflection. Results of this executed operation are communicated back to the initiating/orchestrating agent via a response-messaging queue.

Any agent 210 may act as an orchestrator and send messages to other agents 210 across different servers 112 to perform operations in parallel. Orchestrators may invoke "fire and forget" asynchronous operations. Orchestrators may, additionally or in the alternative, wait for invoked operations to complete on the targeted host and collect responses. Orchestrator agents then choose to evaluate these received responses before performing the next set of operations. Agents 210 may also safely retry invoking the same operation on the targeted agent. A targeted agent may choose to ignore incoming messages if the similar operation is already in progress, or reply back with the stored results from previous execution. The agents 210 may be instructed to periodically perform repeated operations or listen for events and send results via the queue to any data collection agent.

The platform assumes little control or awareness of operations executed in parallel beyond its success and failure, thus making it scalable. The platform provides basic functionality needed in a distributed execution environment such as start, stop and pause of operations and agents. It also reports and monitors health of operations and agents.

A. Control Center & Datacenter Operations

FIG. 6 is a flow chart of example operations 600 performed by a control center and datacenter of a distributed computing system. For ease of explanation, but without any intended limitation, the example of FIG. 6 is described in the specific context of FIG. 1 and FIG. 2. In this regard, the operations 600 are performed in the context of the illustrated failure resistant distributed computing system 100. As mentioned above, this system includes primary 110.1 and secondary 110.2 datacenters, each datacenter 110 including a plurality of computerized servers 112. Each server 112 includes one or more digital data processing machines, and provides at least one processing node 204. Each of the datacenters 110 includes at least one messaging queue 116 in communication with the computerized servers 112 of that datacenter 110. One or more interlinks 130 interconnect the messaging queues 116.1, 116.2 of the primary 110.1 and secondary 110.2 datacenters. The control center 102 includes one or more digital data processing machines coupled to the messaging queues 116.

In operation 602, the control center 102 selects one or more orchestrations from a predefined list in storage 103. Broadly, the orchestrations are selected to carry out tasks as part of the control center's 102 strategy of managing the datacenters 110. More specifically, the orchestrations may perform tasks including, but not limited to:

starting and stopping processing modes;
changing a database mode between read-only and read-write;
changing connection strings;
switching DNS entries;
running post-validation;
running discovery;
supporting database isolation;
conducting validations, including validating an application instance, and validating topology information;
transferring MySQL instances and all application instances connected to catalogs on those MySQL instances;
failover of MySQL instances;
transfer and failover of a database server and all My SQL instances on that server;
transfer and failover of a rack and all database servers in that rack;
transfer and failover of an entire datacenter;
supporting triggering operations via a user interface in a command line program or user interface;
updating a CMDB state;
gathering topology information;
updating the CMDB with a validation state; and
forwarding validation commands to other validation executors.

Also in operation 602, the control center 102 transmits the selected orchestrations to at least one of the computerized servers 112. In one example, the data center 102 broadcasts some or all messages to all computerized servers rather than targeting a message to the intended server. In a different example, some or all messages are targeted to specific computerized servers. In the present example, where the primary datacenter 110 is taken to be functioning properly, the control center 102 transmits the orchestrations to the servers 112 via the messaging queue 116.

For some or all of the selected orchestrations, the transmission includes less than all machine-executable actions necessary to execute the selected orchestration. For example, the transmission may include a partial listing of machine-executable actions of the orchestration, or merely the name of the orchestration or identification of a program, routine, subroutine, or other set of tasks.

In operation 604, the targeted server 112 receives the selected orchestrations from the control center 102 via the appropriate messaging queue 116. More particularly, the messaging queue 116 as implemented by the server 112 receives the message containing the transmitted orchestration, and the agent 210 of the server 112 forwards the message itself or a notification of the message to the mailbox 212 of the targeted server 112.

At least one orchestration in the predefined list of orchestrations 103 represents a machine-executable orchestration to conduct a failover operation of the primary datacenter 110 to the secondary datacenter 110.2. This failover operation shifts performance of various tasks from a set of processing nodes 204 of the primary datacenter 110.1 to a set of processing nodes of the secondary datacenter 110.2. One example of these shifted tasks includes managing storage accessible by remotely located clients 150. Another example of these tasks is running programs of machine-implemented operations on behalf of remotely located clients 150, for example using an instantiation of a virtual machine.

Despite a given server 112 receiving an orchestration from the data center 102, the given server 112 in some cases might not perform all actions to fully carry out the orchestration. Namely, in one implementation, one or more of the machine-executable actions corresponding to an orchestration may require a server 112 to transmit a command for execution by another server. This may be referred to as delegation.

In one implementation, the operations 600 further include operations by which the computerized server supplements orchestrations received in 604. Namely, a computerized server 112 may respond to receipt 604 of instruction to execute one of the received orchestrations by transmitting to the control center 102 a request for an updated, corrected, or expanded list of machine-executable actions necessary to execute the received orchestration. This may be performed regularly, on a calendar schedule, or in response to the server's detection of an abbreviated, defective, stale, or insufficient orchestration.

Further expanding on the previous example, the server's 112 request for an updated list of actions may include a first version of actions necessary to execute the received orchestration, for example, according to the server's own action cache stored in 214. In response, the control center 102 compares the server-submitted version against a master version maintained by the control center, for example in the storage 103. If the submitted version and master versions differ, the control center 102 prepares a message outlining changes between the versions, and transmits this message to the submitting server 112.

In a different implementation, some or all of the transmission operations 602 include a differences list corresponding to a given orchestration. Thus, operation 602 may be used to carry out the abbreviated distribution of software instructions by sending changes to the nodes instead of complete software instructions. The differences list may include a change log from a list of actions previously synchronized between control center 102 and datacenter. In this example, the server 112 performs the given orchestration by executing an amended set of predefined machine-executable actions. The amended set of predefined machine-executable actions includes the full set of predefined machine-executable actions necessary to execute the given orchestration from 214, and further as amended according to the differences list from the control center 102.

In a further example, one or more of the orchestrations from 103 include machine-executable actions to override one or more of the full set of machine-executable actions from 214.

In response to receiving an orchestration, the targeted server 112 performs operation 606. Mere receipt of the orchestration may constitute a tacit instruction to perform one of the received orchestrations, or there the control center 102 may send an overt command to this effect. In operation 606, the targeted server 112 executes the received orchestration by referencing a full set of actions corresponding to the received orchestration as previously stored or programmed into the computerized server (and optionally updated by changes from the control center 102 as detailed above) and executing the referenced full set of actions. For example, in an example with no changes or updates from the control center 102, the agent 210 of the targeted server 112 references the full set of stored or programmed actions 214, and then executes the actions.

In one implementation, the subject orchestration from the control center 102 includes actions executable by one of the computerized servers 122 of the secondary datacenter 110.2 to begin operating the secondary datacenter 110.2 in substitution for the primary datacenter 110.1. For example, these machine-executable actions may include the following example sequence of tasks: (1) stopping processing nodes being executed by computerized servers of the primary and secondary datacenters, (2) for all databases provided by computerized servers of the primary datacenter, placing the databases in read-only mode, (3) for all databases provided by computerized servers of the secondary datacenter, placing the databases in read-write mode, (4) re-routing connections of the processing nodes of computerized servers of the primary datacenter to processing nodes of computerized servers of the secondary datacenter, and (5) restarting processing nodes being executed by computerized servers of the primary and secondary datacenters.

As a more particular example, an example sequence of failover actions by the primary datacenter include: (1) pre-validation, including a test if the transfer can complete, and stopping transfer if any tests fail, (2) stopping all active primary and standby nodes, (3) switching the primary database to read-only mode, (4) switching the secondary database to read-write mode, making it primary, after replication lag is zero, (5) changing connection strings in application nodes to point to new primary, (6) switching DNS entries to point to the F5 load balancer closer to new primary, (7) starting all nodes, (8) running post-validation, and (9) running discovery and updating CMDB authoritative values.

Figure 11:
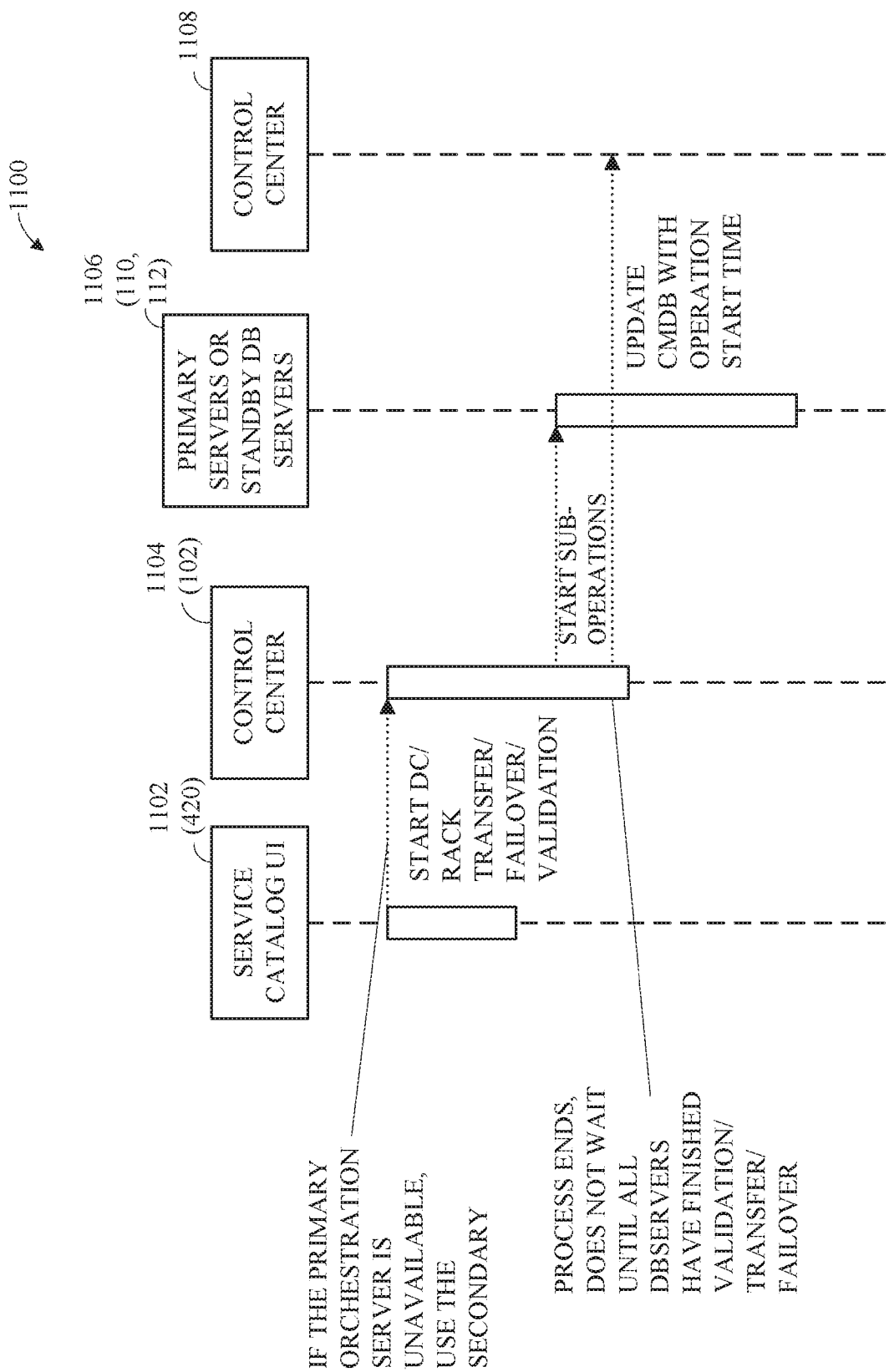
FIG. 11 is a state diagram of data management operations.

To further illustrate an implementation of data management in the environment of FIG. 1, FIG. 11 is a state diagram of example data management operations. An operator (not shown) initiates data management operations at a user interface 1102 (420). Examples of these operations include data transfer, failover, and validation operations. The user interface 1102 transfers the operator instructions to the control center 1104. If the primary datacenter 110.1 is unavailable, the secondary datacenter 110.2 is used. The control center 1104 begins sub-operations by transmitting instructions to the primary or secondary datacenter 1106 (110, 112), as applicable. When the data management operation ends, the control center 1104 updates the CMDB with relevant information such as the operation start time.

FIGS. 12A-C are parts that together comprise a pictorial view of an example status report 1200 resulting from an example data management operation, which in this case is a data transfer. The status report 1200 indicates which sub-operations were performed as part of the transfer, and the status of each operation as completed, error/failed, not started, or in-progress. The status report 1200 includes a number of boxes 1202-1208. The left column boxes 1202-1204 shown in FIG. 12A correspond to the primary datacenter 110.1, and right column boxes 1206-1208 shown in FIG. 12B correspond to the secondary datacenter 110.2. Some boxes, such as 1202 and 1206, refer to datacenter nodes serving a database function. Other boxes, such as 1203, 1204, 1207, and 1208 refer to datacenter nodes serving an application function. A box 1205 concerns overall status and operations of the system 100.

B. Agent Operations

FIG. 7 is a flow chart of certain example operations 700 performed by computerized servers of a distributed computing system. For ease of explanation, but without any intended limitation, the example of FIG. 7 is described in the specific context of the hardware of FIG. 1 and FIG. 2. In the presently illustrated implementation, each of the agent's functions by separately carrying out the operations 700. For ease of illustration, the operations 700 are explained in the context of the agent 210 of the server 112.

As mentioned above, each computerized server 112 includes a mailbox 212 and each of the computerized servers 112 is programmed to execute commands received at the server's mailbox 212. Therefore, in this context, operation 702 illustrates the operation of the agent 210 periodically or continuously monitoring the mailbox 212 for arrival of new messages.

Operation 703 illustrates the receipt of a message. In one example, a message specifies an action to be performed and any applicable criteria. "Message" may include messages, commands, data, or other machine-readable information. Messages include orchestrations from the data center 102 and commands from another one of the servers.

Response to arrival of the new message, the agent 210 determines the course of action to be taken in operation 704. In the case of an orchestration, this may include identifying the full set of actions stored in 214, supplementing or clarifying the received orchestration, processing a change or differences log of actions, etc. In the case of a message from another one of the servers, the message itself may for example reference machine-executable actions stored in 214.

After operation 704, the agent 210 takes action as requested. Depending on the message contents, a proper response may be for the agent 210 to ignore the message as shown in operation 706. This may be appropriate because, as explained above, example, the data center 110 may broadcast some or all messages to all servers 112 rather than targeting a message to the intended server 112. Ignoring an incoming message may also be appropriate, for example, if the server 112 or agent 210 has already initiated the task requested by the message.

If the message pertains to the agent 210, however, and the requested action is not already in progress, then the agent 210 initiates appropriate actions in operation 708. In the context of actions to be performed by the agent 210 itself, operation 708 proceeds to operation 712, where one or more of the agent's processing nodes 204 execute the action. These actions may include running programs on behalf of remote clients 150, managing or accessing stored data on behalf of remote clients 150, collecting and pushing data to the control center 102, cooperating with the control center 102 to carry out management of the system 100, and other such tasks.

As for actions to be performed by other agents, operation 708 proceeds to operation 710, where the agent 210 directs one or more other servers' agents to execute prescribed tasks. In this instance, the delegated agent may assume the role and responsibility of transmitting further synchronous or asynchronous messages to other servers 112 in connection with the prescribed tasks of computerized servers.

In the context of an orchestration from the control center 102, one outcome of operation 708 is that the agent 210 may transfer control of execution of future actions of an orchestration to a different computerized server 112. In both of operations 710 and 712, the actions may be initiated by sending asynchronous "send and forget" commands, or by sending synchronous commands with a coordinated follow up.

C. Other Features

The architecture and operation of the disclosed failure resistant distributed computing system provides a number of benefits. For example, since the control center 102 broadcasts commands throughout the system 100 and the agents are interchangeable, and the control center 102 assumes limited or no awareness of operations executed in parallel beyond its success and failure, the system 100 is scalable and also resistant to failure of any one server 112 or agent 210. This platform provides other capabilities such as orchestration of various operations on a cluster of servers 112 across different datacenters 110, execution of synchronous and asynchronous operations with callback mechanism on remote servers, the ability to safely retry operations, and real time data collection across different hosts. Some other advantages include parallel failover of "Advanced Highly Available" (AHA) application instances, auditing to ensure AHA of instances and alerting on audit failures, and the collection of service intelligence of application instances across datacenters 110. A further benefit is the significant flexibility afforded by providing distributed initialization and control of orchestrations that are predefined by a central authority and pre-coded.

3. Other Implementations

All or a portion of implementations of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The implementations herein may be described in terms of functional block components and various processing operations. Such functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the invention may be implemented with any programming or scripting language such as C, C++, Java, assembler, or the like, with the various algorithms being implemented with any combination of data structures, objects, processes, routines or other programming elements. Functional implementations may be implemented in algorithms that execute on one or more processors. Furthermore, the implementations of the invention could employ any number of conventional techniques for electronics configuration, signal processing and/or control, data processing and the like. The words "mechanism" and "element" are used broadly and are not limited to mechanical or physical embodiments or implementations, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

Information, data, and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

The word "example" is used herein to mean serving as an example, instance, or illustration. Any implementation or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, implementation, or implementation unless described as such.

The particular implementations shown and described herein are illustrative examples of the invention and are not intended to otherwise limit the scope of the invention in any way. For the sake of brevity, conventional electronics, control systems, software development and other functional implementations of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

All references, including publications, patent applications, and patents, cited herein are hereby incorporated by reference to the same extent as if each reference were individually and specifically indicated as incorporated by reference and were set forth in its entirety herein.

The above-described implementations have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for performing a failover operation between a primary datacenter and a standby datacenter, comprising:
    detecting, via a control center, that a failover condition exists in the primary datacenter;
    selecting, via the control center, an orchestration from a predefined list of orchestrations to facilitate a failover operation from the primary datacenter to the standby datacenter;
    transmitting, via a messaging queue, an indication of the selected orchestration to the primary datacenter, the standby datacenter, or both;
    executing the selected orchestration to perform the failover operation from the primary datacenter to the standby datacenter; and
    redirecting execution of tasks from the primary datacenter to the standby datacenter.

2. The method, as set forth in claim 1, wherein the standby datacenter is configured to mirror changes from the primary datacenter prior to redirecting the execution of tasks, and wherein the primary datacenter is configured to mirror changes from the standby datacenter after redirecting the execution of tasks.

3. The method, as set forth in claim 1, wherein redirecting execution of tasks from the primary datacenter to the standby datacenter comprises:
    stopping all processing nodes being executed by computerized servers of the primary datacenter and of the standby datacenter.

4. The method, as set forth in claim 3, wherein the transmitting an indication of the selected orchestration further comprises:
    receiving, via at least one of the processing nodes, a request for an updated, corrected, expanded, or a combination thereof, of actions to execute the selected orchestration.

5. The method, as set forth in claim 1, wherein redirecting execution of tasks from the primary datacenter to the standby datacenter comprises:
    changing one or more connection strings in application nodes to point to the standby datacenter.

6. The method, as set forth in claim 5, wherein redirecting execution of tasks from the primary datacenter to the standby datacenter comprises:
    switching one or more DNS entries to point to a load balancer of the standby datacenter.

7. The method, as set forth in claim 1, comprising running a discovery process on the standby datacenter and updating a configuration management database based on the discovery process.

8. A non-transitory tangible computer readable medium comprising instructions that when executed by a processor cause the processor to:
    detect, via a control center, that a failover condition exists in a primary datacenter;
    select, via the control center, an orchestration from a predefined list of orchestrations to facilitate a failover operation from the primary datacenter to a standby datacenter;
    transmit, via a messaging queue, an indication of the selected orchestration to the primary datacenter, a secondary datacenter, or both;
    stop, via the control center, processing on all active nodes of the primary datacenter and of the standby datacenter, in accordance with the selected orchestration;
    route, via the control center, one or more connections of processing nodes of the primary datacenter to processing nodes of the standby datacenter, in accordance with the selected orchestration; and
    restart, via the control center, all processing nodes of the primary datacenter and the standby datacenter.

9. The non-transitory tangible computer readable medium, as set forth in claim 8, wherein detecting that the failover condition exists in the primary datacenter comprises:
    testing to determine whether a transfer to the primary datacenter can complete.

10. The non-transitory tangible computer readable medium, as set forth in claim 8, wherein the instructions that when executed by the processor cause the processor to:
    run, via the control center, a post validation operation.

11. The non-transitory tangible computer readable medium, as set forth in claim 8, wherein routing connections of the processing nodes of the primary datacenter to processing nodes of the standby datacenter comprises:
    changing one or more connection strings in application nodes to point to the standby datacenter.

12. The non-transitory tangible computer readable medium, as set forth in claim 11, wherein routing connections of processing nodes of the primary datacenter to processing nodes of the standby datacenter comprises:
    switching one or more DNS entries to point to a load balancer of the standby datacenter.

13. The non-transitory tangible computer readable medium, as set forth in claim 8, wherein the instructions, when executed by the processor, cause the processor to, after restarting all nodes of the standby datacenter, run a discovery process on the standby datacenter and update a configuration management database based on the discovery process.

14. A distributed computing system comprising:
    a primary datacenter having a plurality of computerized servers and a plurality of databases;
    a secondary datacenter having a plurality of computerized servers and a plurality of databases; and
    a control center having a data processing machine and being communicatively coupled to the primary datacenter and the secondary datacenter, wherein the data processing machine of the control center is configured to provide an instruction to perform a failover operation to at least one of the computerized servers of the primary datacenter and/or secondary datacenter to cause the failover operation from the primary datacenter to the secondary datacenter to be conducted, wherein the failover operation comprises:
    detecting, via the control center, that a failover condition exists in the primary datacenter;
    selecting, via the control center, an orchestration from a predefined list of orchestrations to facilitate the failover operation from the primary datacenter to the secondary datacenter;
    transmitting, via a messaging queue, an indication of the selected orchestration to the primary datacenter, the secondary datacenter, or both;
    stopping, via the control center, processing on the primary datacenter and the secondary datacenter;
    redirecting, via the control center, communications from the primary datacenter to the secondary datacenter; and
    restarting, via the control center, the primary datacenter and the secondary datacenter.

15. The system, as set forth in claim 14, in response to the detection that the failover condition exists, wherein the control center is configured to provide the instruction to perform the failover operation.

16. The system, as set forth in claim 14, wherein stopping processing on the primary datacenter and the secondary datacenter comprises:
    stopping all processing nodes being executed by the plurality of computerized servers of the primary datacenter and by the plurality of computerized servers of the secondary datacenter.

17. The system, as set forth in claim 14, wherein the at least one of the computerized server does not perform the instruction to perform the failover operation, and wherein the at least one computerized server delegates the instruction to a different computerized server.

18. The system, as set forth in claim 14, wherein redirecting communications from the primary datacenter to the secondary datacenter comprises:
    changing one or more connection strings in application nodes to point to the secondary datacenter as a new primary datacenter.

19. The system, as set forth in claim 18, wherein redirecting communications from the primary datacenter to the secondary datacenter comprises:
    switching one or more DNS entries to point to a load balancer closer to the new primary datacenter.

20. The system, as set forth in claim 14, wherein the failover operation comprises, after restarting the secondary datacenter, running a discovery process on all processing nodes of the secondary datacenter and updating a configuration management database based on the discovery process.

* * * * *